United States Patent
Wang et al.

(10) Patent No.: US 12,091,974 B2
(45) Date of Patent: Sep. 17, 2024

(54) CENTRIFUGAL INTELLIGENT CONSTRUCTION DEVICE FOR EXCAVATION CONCRETE STRUCTURE, AND APPLICATION THEREOF

(71) Applicant: ZHEJIANG UNIVERSITY, Zhejiang (CN)

(72) Inventors: Hailong Wang, Zhejiang (CN); Xiaoyan Sun, Zhejiang (CN); Zhennan Wu, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/288,366

(22) PCT Filed: Mar. 15, 2023

(86) PCT No.: PCT/CN2023/078603
§ 371 (c)(1),
(2) Date: Oct. 25, 2023

(87) PCT Pub. No.: WO2023/174046
PCT Pub. Date: Sep. 21, 2023

(65) Prior Publication Data
US 2024/0084701 A1  Mar. 14, 2024

(30) Foreign Application Priority Data
Mar. 16, 2022   (CN) .......................... 202210260909.5

(51) Int. Cl.
*E21D 11/00* (2006.01)
*B02C 23/16* (2006.01)
(Continued)

(52) U.S. Cl.
CPC ............ *E21D 11/086* (2016.01); *B02C 23/16* (2013.01); *B04B 3/00* (2013.01); *B28B 1/001* (2013.01);
(Continued)

(58) Field of Classification Search
CPC ......... E21D 11/086; E21D 11/10; E21D 9/04; E21D 9/10; E21D 9/1006; E21D 9/14; E21D 9/0607; E21D 9/124; B02C 23/16
See application file for complete search history.

(56) References Cited

U.S. PATENT DOCUMENTS 2,660,034 A  *  11/1953  Kemper ................ E21D 11/105
                                                        406/40
3,260,054 A  *  7/1966  Hans ........................ E21D 9/06
                                                        405/138
(Continued)

FOREIGN PATENT DOCUMENTS

CN    206778884 U    12/2017
CN    108756907      11/2018
(Continued)

*Primary Examiner* — Benjamin F Fiorello
(74) *Attorney, Agent, or Firm* — Jiwen Chen; Joywin IP Law PLLC

(57) ABSTRACT

The present invention discloses a centrifugal intelligent construction device for excavating concrete structure: a push-type excavation equipment, excavating rocks and soil, and collecting crushed stones, sand, soil, and water; a centrifugal screening equipment, performing centrifugal screening and classification collection on the collected crushed stones, sand, soil, and water; the intelligent batching equipment, which matches the classified crushed stones, sand, soil, and water according to their quality and fineness, adding cementitious materials, auxiliary materials, additives, and activators, and mixing them to obtain a mixed wet material; a centrifugal printing equipment, pumping and extruding the mixed wet materials, and using a centrifugal (Continued)

rotating outer cylinder to print and compact them into dense shape; an intelligent reinforcement equipment, integrating reinforcements between the layers of printed concrete strips by using the wall mounted laying, positioning and inserting reinforcements inside the printed concrete strips during the centrifugal printing process to form an integrated reinforced concrete structure. The device can achieve the additive and intelligent construction of closed concrete structures in underground, underwater, and extreme construction environments, solving the technical dilemma of insufficient engineering application scope of open additive manufacturing technology.

6 Claims, 4 Drawing Sheets

(51) Int. Cl.
| B04B 3/00 | (2006.01) |
| B28B 1/00 | (2006.01) |
| B28B 1/20 | (2006.01) |
| B28B 17/00 | (2006.01) |
| B28B 23/02 | (2006.01) |
| B33Y 10/00 | (2015.01) |
| B33Y 30/00 | (2015.01) |
| B33Y 40/00 | (2020.01) |
| B33Y 50/00 | (2015.01) |
| E21D 9/06 | (2006.01) |
| E21D 9/12 | (2006.01) |
| E21D 11/08 | (2006.01) |

(52) U.S. Cl.
CPC ............ *B28B 1/20* (2013.01); *B28B 17/0081* (2013.01); *B28B 23/02* (2013.01); *B33Y 10/00* (2014.12); *B33Y 30/00* (2014.12); *B33Y 40/00* (2014.12); *B33Y 50/00* (2014.12); *E21D 9/0607* (2013.01); *E21D 9/124* (2013.01); *B02C 2023/165* (2013.01)

(56) References Cited

U.S. PATENT DOCUMENTS

| 3,972,200 | A | * | 8/1976 | Scarpi | E21D 11/406 |
| | | | | | 405/141 |
| 4,260,194 | A | * | 4/1981 | Blindow | E21D 9/1073 |
| | | | | | 299/60 |
| 5,076,729 | A | * | 12/1991 | Grotenhofer | G02B 6/4459 |
| | | | | | 405/138 |
| 5,104,262 | A | * | 4/1992 | Forsberg | E21B 10/327 |
| | | | | | 299/56 |
| 9,506,344 | B2 | * | 11/2016 | Harrison | E21B 7/067 |

FOREIGN PATENT DOCUMENTS

| CN | 112709443 | 4/2021 |
| CN | 112939520 | 6/2021 |

* cited by examiner

CENTRIFUGAL INTELLIGENT CONSTRUCTION DEVICE FOR EXCAVATION CONCRETE STRUCTURE, AND APPLICATION THEREOF

This is a U.S. national stage application of PCT Application No. PCT/CN2023/078603 under 35 U.S.C. 371, filed Mar. 15, 2023 in Chinese, claiming priority of Chinese Application No. 202210260909.5, filed Mar. 16, 2022, all of which are hereby incorporated by reference.

TECHNICAL FIELD

The present invention relates to technical fields such as building structure, building equipment, and construction, in particular to a centrifugal intelligent construction device for excavation concrete structure, and application thereof.

DESCRIPTION OF RELATED ART 3D printing, also known as additive manufacturing, is a technology that uses digital model files as the basis and uses adhesive materials such as powdered metal or plastic to construct objects through layer-by-layer printing. 3D printed buildings can effectively reduce construction waste, improve construction efficiency, shorten construction period, reduce labor, improve mechanization level, and achieve arbitrary spatial design through computer control, energy conservation and emission reduction, and improve the environment. With the scarcity of land resources, the scientific development and utilization of marine resources has become one of the future development trends in the construction industry. The use of 3D printed concrete technology for structural construction in underground, underwater, and extreme environment has broad development prospects. The existing 3D building materials are very plentiful. CN107603162A, CN107619230A, CN107200 536A, and CN10 7032669A patents have published the use of 3D printed concrete materials, with significant improvements in both types and strength. Our research group has also proposed a series of construction techniques for reinforcement and enhancement of 3D printed concrete, such as CN201811038630.2, CN2019112135591, and CN201911000935.9 patent applications. However, the existing 3D printing concrete can only be used to construct the spatial structures on land, and cannot meet the development needs of intelligent construction in deep ground, deep sea, and deep space.

Unlike the open construction method, shield tunneling can be used for tunnel excavation in underground soft soil and lithostratigraphy, and is a construction method that builds support while excavating. According to their working principles, they are divided into manual excavation shield tunneling, extrusion shield tunneling, semi mechanical shield tunneling, and mechanical shield tunneling, which are widely used in the field of engineering construction. Centrifuge technology is a separation and analysis technology developed based on the outward centrifugal force of particles in uniform circular motion, it is currently widely used in industrial and scientific fields. For example, a balance centrifugation method can be used to separate particles based on their size and shape, an equal gravity centrifugation method can be adopted to separate particles based on their density difference, and a classic sedimentation balance centrifugation method can be used to measure the molecular weight, purity estimation, and conformational changes of biological macromolecules. Centrifuge technology is used for biological, medical, chemical, and other analysis, separation, and purification of samples, with centrifugation speeds ranging from several thousand to tens of thousands of revolutions per minute or above; it is used for industrial production, such as chemical, pharmaceutical, food, and other industrial sieves, the separation core speed is below 5000 revolutions per minute.

Giving that the existing 3D printing and construction device technology has a narrow product adaptation range, the process cannot be suitable for the construction needs of intelligent concrete structures facing deep sea, deep ground, and deep space.

SUMMARY OF THE INVENTION

The object of the present invention is to provide an intelligent construction device for excavating concrete structure, which can achieve the additive intelligent construction of closed concrete structures in underground, underwater, and extreme construction environments, solving the technical dilemma of insufficient engineering application scope of open-type additive manufacturing technology, and forming a new type of closed excavation type additive intelligent construction structure technology and hardware system.

The present invention provides the following technical solution:

a centrifugal intelligent construction device for excavating concrete structure, comprising:
- a push-type excavation equipment, excavating rocks and foundations, and collecting crushed stones, sand, soil, and water;
- a centrifugal screening equipment, performing centrifugal screening and classification collection on the collected crushed stones, sand, soil, and water;
- an intelligent batching equipment, which matches the classified crushed stones, sand, soil, and water according to their quality and fineness, adding cementitious materials, auxiliary materials, additives, and activators, and mixing them to obtain a mixed wet material;
- a centrifugal printing equipment, pumping and extruding the mixed wet materials, and using a centrifugal rotating outer cylinder to print and compact them into dense shape;
- an intelligent reinforcement equipment, during the centrifugal printing process, integrated reinforcement is achieved through wall mounted laying, positioning and inserting reinforcing bars.

The push-type excavation equipment uses a blade to cut and crush rocks for tunneling construction, and transmits and collects crushed stones, sand, soil, and water through a screw conveyor by using a motor into the centrifugal screening equipment.

The centrifugal screening equipment achieves a reprocessing of oversized crushed stones by arranging steel rollers that radiate from the inside out to rotate, the steel rollers and screens are used to screen crushed stones of different particle sizes, as well as sand and soil, the processing and screening of concrete fine aggregate and water are completed through a permeable layer, the screened materials are transported from the centrifugal screening equipment to the intelligent batching equipment according to the coarse aggregate, fine aggregate, and water.

Among them, crushed stones, sand, and soil are screened according to particle size and density, and distributed by mass to the intelligent batching equipment, water is collected and transported to the intelligent batching equipment, and excess water is eliminated.

The intelligent batching equipment uses drums with different center distances to weigh and mix, and designing a combination of the coarse aggregate (crushed stones/sand material a particle size greater than 5 mm), fine aggregate (crushed stones/sand material/soil with a particle size between 0.16-5 mm), water, cementitious materials, auxiliary materials, admixtures, and activators, mixing to obtain the concrete wet materials;

The centrifugal printing equipment can translate along the axis, use a screw to transport the wet materials and pump them out, and extrude the concrete layer by layer on the outer cylinder wall that rotates and has convex and concave distribution points on the surface, the concrete of additive manufacturing is denser shaped through centrifugal action.

The intelligent reinforcement equipment comprises arranging reinforcement materials between the layers of printed concrete strips by using the wall mounted laying, and inserting reinforcement inside the printed concrete strips after location positioning of reinforcing bar, forming the integrated reinforced concrete structure.

The intelligent reinforcement equipment utilizes a robotic arm to position and lay the reinforcement materials by using the cylindrical coordinates of the centrifugal rotating outer cylinder.

The present invention also provides an application of the centrifugal intelligent construction device for excavating concrete structure in underground (comprising rocks and soil), underwater (comprising freshwater and seawater), and extreme construction environment (lunar environment, Martian environment, polar environment, nuclear explosion environment, etc.).

The centrifugal intelligent construction device for excavating concrete structure provided by the present invention also comprises a power system and a control system: the power system provides the power required for excavation, centrifugation, and mixing for the entire intelligent construction device; the control system provides programming control and intelligent management for centrifugal feeding, intelligent batching, printing, and reinforcement arrangement.

The centrifugal intelligent construction device for excavating concrete structure provided by the present invention is suitable for cement-based concrete materials, comprising Portland cement clinker, sulpho-aluminate cement clinker, sand and gravel, auxiliary materials, additives, and activators; reinforcement materials, comprising steel bars, fiber polymer bars, composite bars, etc. It has the construction features comprising mechanization, digitization, and intelligence, ensuring safe and reliable construction in underwater, underground, and extreme environment.

A centrifugal intelligent construction device for excavating concrete structure carries out intelligent construction of safe and reliable concrete structures in underground, underwater, and extreme construction environment, comprising the following steps:

step 1: based on the information from geotechnical and geological surveys, using a positioning system to guide engineering excavation, and the push-type excavation equipment collecting the crushed stones, sand, soil, and water, processing them into concrete aggregate raw materials, and transmitting them into the centrifugal screening equipment;

step 2: the centrifugal screening equipment crushing and screening the raw materials, distinguishing crushed stones, sand, soil, and water, and transmitting them to the concrete batching system (intelligent batching equipment) for material production;

step 3: the intelligent batching equipment mixing the concrete aggregate raw materials, cementitious materials, auxiliary materials, admixtures, activators, and water according to the quality and particle size parameters to form the wet concrete materials;

step 4: the centrifugal printing equipment pumping and extruding the wet concrete materials, and processing the wet concrete materials layer by layer on the outer cylinder wall with high-speed, then obtaining the dense and high-strength concrete structures by using additive manufacturing and centrifugal molding processes;

step 5: the intelligent reinforcement equipment locating the reinforcement materials according to the coordinates of the outer cylinder wall, laying the reinforcement materials between the printed stacked concrete layers, and inserting the reinforcement materials inside the printed concrete to form a spatial overall reinforced concrete structure;

step 6: pushing the formed concrete structure outward and continuing the printing and reinforcement production of the structure in the next section;

step 7: repeating the above steps until the construction of the structure is completed.

The present invention integrates additive manufacturing technology, centrifugal screening technology, and tunneling shield tunneling technology, and proposes an integrated intelligent construction technology and equipment implementation scheme for centrifugal screening after tunneling shield tunneling, intelligent configuration of concrete additive manufacturing printing matrix, and reinforcing enhancement at the same time, this solves the technical defects of intelligent manufacturing equipment in the field of civil engineering technology, and provides hardware foundation for an integrated intelligent additive construction technology in underground, underwater and space engineering buildings.

Due to the adoption of the above technical solution, the present invention has the following beneficial effects:

1. The present invention adopts excavation type construction, which can form a closed environment in underground, underwater, and extreme environment, ensuring digital intelligent engineering construction in harsh and unsuitable human construction environments, and breaking through the technical limitations of existing concrete structure additive intelligent construction intelligence operating in open spaces.

2. The present invention utilizes a tunneling rotary motor to design and drive the centrifugal screening equipment for crushing stones, sand, and soil materials, as well as collecting water, it is integrated with an intelligent weighing configuration system to complete the intelligent processing and preparation of concrete raw materials.

3. The present invention utilizes additive manufacturing technology and centrifugal compactness method to significantly improve the quality of concrete printing and production in underground, underwater, and harsh environments, improving the combination of centrifugal forming processes, achieving mold free construction of concrete through layered forming, and enhancing the strength of concrete through centrifugal forming, as well as the intelligent construction process and scope of application.

4. The present invention utilizes intelligent reinforcement technology to achieve the additive intelligent construction of concrete structures by using centrifugal printing and integral reinforcement, breaking through the technical bottlenecks of engineering construction in underwater, underground, and harsh environment, and forming an integrated reinforcement enhancement for additive intelligent construction of concrete, ensuring structural safety.

5. The present invention utilizes the pushing section construction method, which involves excavation, screening, configuration, printing, reinforcement, and section construction, the overall structure is formed through the reinforcement between interlayers, ensuring the integrity and service reliability of the construction structure.

DETAILED DESCRIPTION OF THE INVENTION

The following further explains the present invention in conjunction with embodiments. These embodiments are only for illustration and do not limit the scope of protection for the claims of the present invention.

Figure 1:
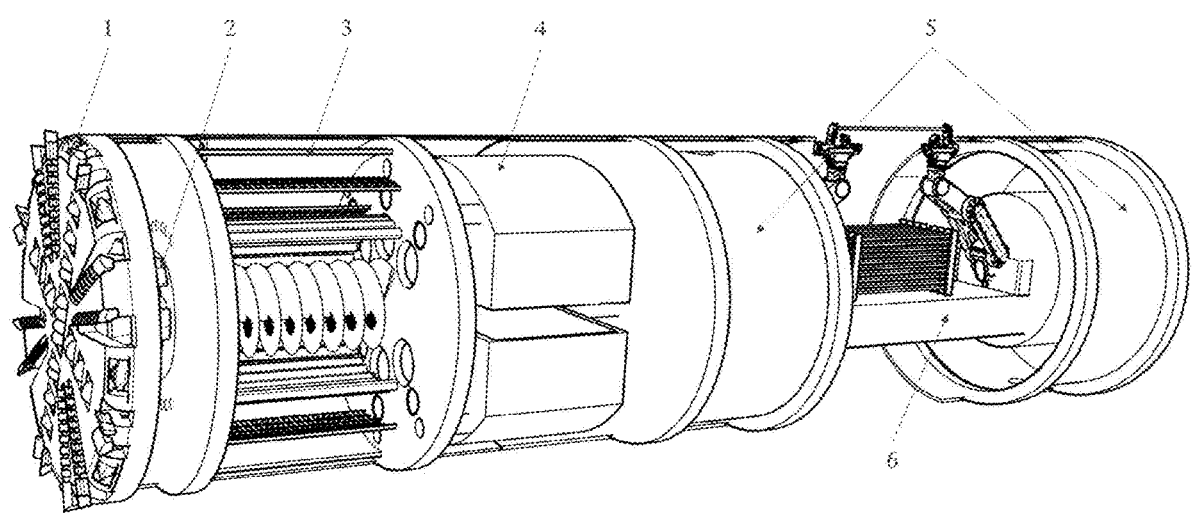
FIG. 1 shows a centrifugal intelligent construction device for excavating concrete structure.

As shown in FIG. 1, the centrifugal intelligent construction device for excavating concrete structure of the present invention comprises:
a push-type excavation equipment 1, a drive equipment 2, a centrifugal screening equipment 3, an intelligent batching equipment 4, a centrifugal printing equipment 5, and an intelligent reinforcement equipment 6, achieving excavation, collection and crushing of water, rock, and soil materials during underwater, underground, and extreme environment construction, centrifugal screening, batching, and additive manufacturing, centrifugal molding, and integrated reinforcement, forming a new type of excavating centrifugal additive intelligent construction technology and hardware equipment.

Figure 2:
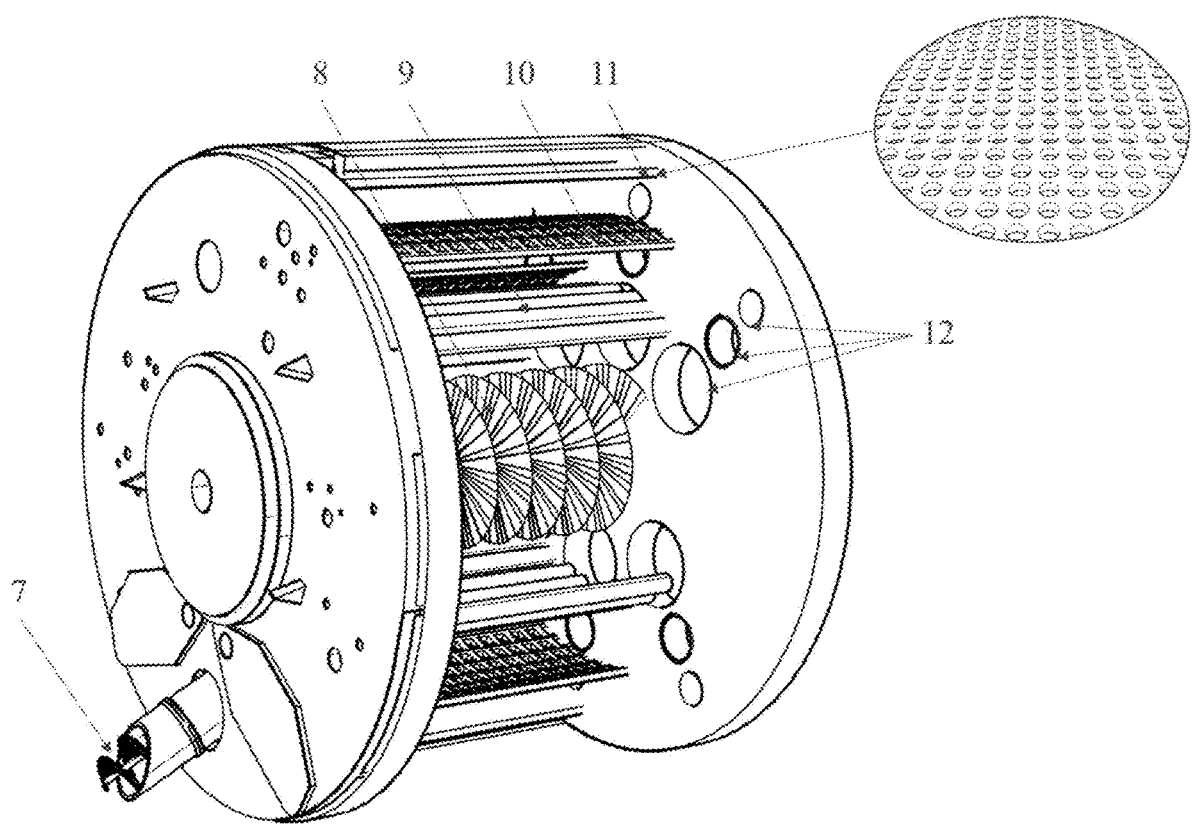
FIG. 2 shows the detailed structure of the centrifugal screening equipment.

As shown in FIG. 2, the push-type excavation equipment 1 can achieve the penetration, crushing, and collection functions of rock and soil. High speed rotating blades are used to cut and crush rock and carry out excavation construction, the crushed stones, sand, soil, and water are transported and collected into the internal centrifugal screening equipment 3 through the screw conveyor 7 by using a high-speed rotating motor. The centrifugal screening equipment 3 is arranged with steel rollers 9 radiating from the inside out to achieve the reprocessing of oversized crushed stones through rotation, a centrifugal rotating motor 8, the steel rollers 9, and screens 10 are used to screen different particle sizes of crushed stones, sand, and soil, a permeable layer 11 is used to complete the processing and screening of concrete fine aggregate and water, the screened materials are divided into coarse aggregate, fine aggregate, and water, the screened coarse aggregate, fine aggregate, and water are transported from the distribution pipelines 12 to the intelligent batching equipment 4.

Figure 3:
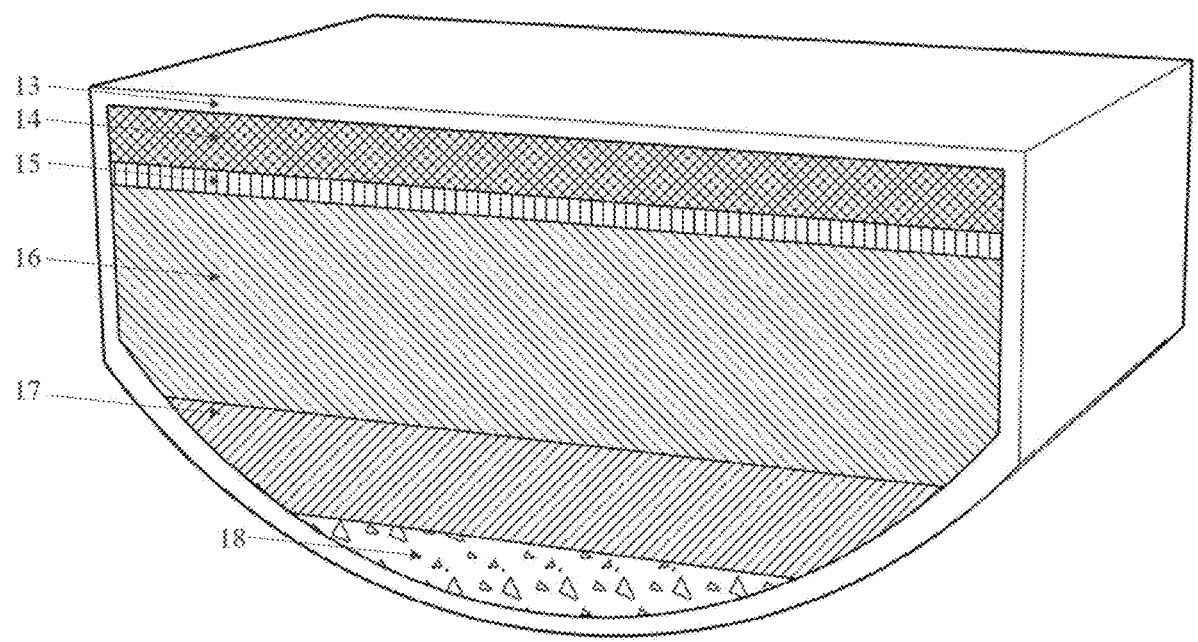
FIG. 3 shows the detailed structure of the intelligent batching equipment.

As shown in FIG. 3, after centrifugal screening by the centrifugal screening equipment 3, the coarse aggregate 18 (crushed stones/sand material with a particle size greater than 5 mm) and the fine aggregate 17 (crushed stones/sand material/soil material with a particle size between 0.16-mm) are classified and collected in the intelligent batching equipment 4 by using barrels with different center distances. The intelligent batching equipment 4 achieves the combination design of water 14, admixture 15 (additives, activators, etc.), cementitious material 16, fine aggregate 17, coarse aggregate 18, and other mixtures through weighing and mixing, using cylinders or drums 13 with different center distances and weighing and mixing, and mixing them into the wet concrete.

Figure 4:
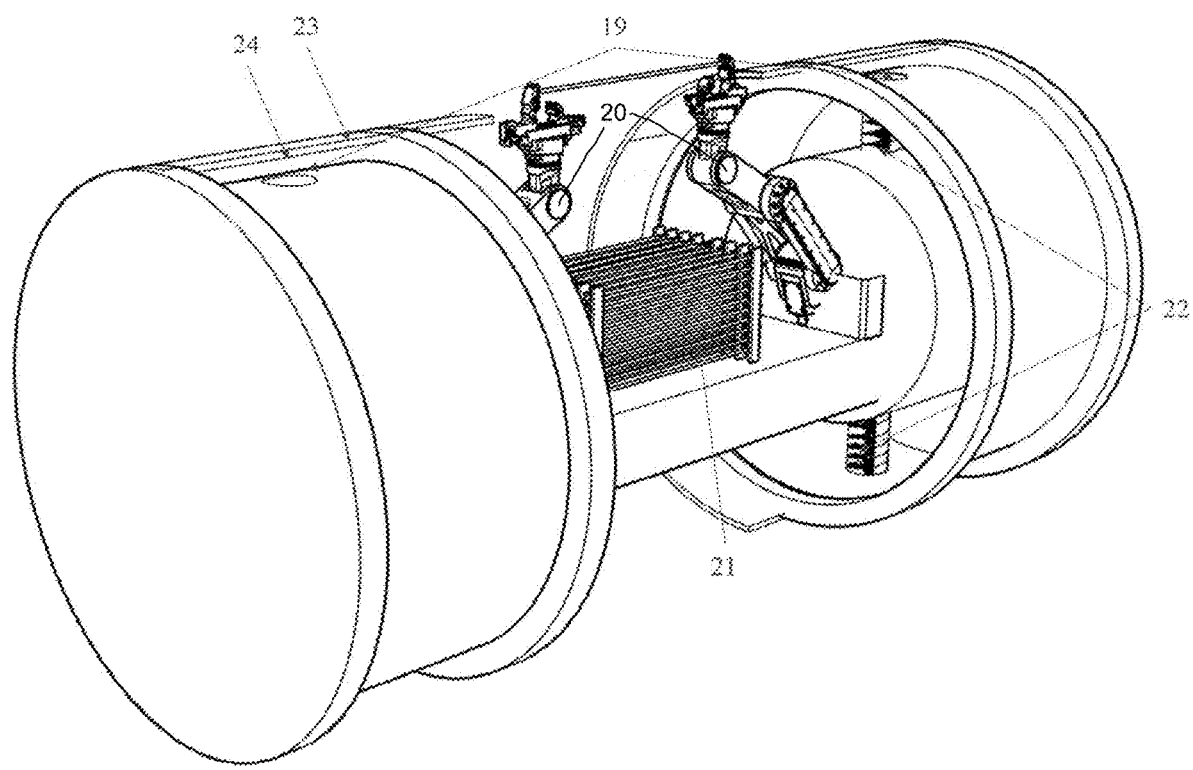
FIG. 4 shows the detailed structure of the intelligent reinforcement equipment.

As shown in FIG. 4, the centrifugal printing equipment 5 can translate along the axis, and use a screw conveyor 22 to pump the wet concrete out through an outlet 19, the concrete is stacked and extruded on the outer cylinder wall 24 that rotates and has convex and concave distribution points on the surface with high-speed rotating of a centrifugal rotating outer cylinder 23, and the additive manufacturing concrete is compacted and formed through centrifugal action. The intelligent reinforcement equipment 6 uses a robotic arm 20 to position and lay the prefabricated reinforcement materials 21 outside the cylindrical wall in terms of the cylindrical coordinates, and integrated with laminated concrete, forming a printed concrete shell structure with overall reinforcement through interlayer reinforcement. For other style structures, simply set up a corresponding shaped bottom mold on the inner wall of the outer cylinder.

The above embodiments are only used to explain the inventive concept of the present invention, and not to limit the protection of the rights of the present invention. Any simple modifications, equivalent changes, and modifications made to the above embodiments based on the essence of the technology and methods of the present invention still fall within the scope of the technology and methods of the present invention.

The invention claimed is:
1. A centrifugal programmable construction device for excavating concrete structure, comprising:
a push-type excavation equipment, excavating rocks and foundations, and collecting crushed stones, sand, soil, and water;
a centrifugal screening equipment, performing centrifugal screening and classification collection on the collected crushed stones, sand, soil, and water; wherein the centrifugal screening equipment achieves a reprocessing of crushed stones by arranging steel rollers that radiate from the inside out to rotate, the steel rollers and screens are used to screen crushed stones of different particle sizes, as well as sand and soil, the processing and screening of concrete fine aggregate and water are completed through a permeable layer, the screened materials are respectively transported from the centrifugal screening equipment to a programmable batching equipment according to the coarse aggregate, fine aggregate, and water;
the programmable batching equipment, which matches the classified crushed stones, sand, soil, and water according to their type and fineness, adding cementitious materials, auxiliary materials, additives, and activators, and mixing them to obtain a mixed wet material; the programmable batching equipment uses drums with different distances of circle centers to weigh and mix, and designing a combination of the coarse aggregate, fine aggregate, water, cementitious materials, auxiliary materials, admixtures, and activators, and mixing to obtain the concrete wet materials;

a centrifugal printing equipment, pumping and extruding the mixed wet materials, and using a centrifugal rotating outer cylinder to print and compact them into a desired shape with increased density; wherein the centrifugal printing equipment translates along the axis, uses a screw to transport the wet materials and pumps the wet materials out, and extrudes the concrete layer by layer on the outer cylinder wall that rotates and has convex and concave distribution points on the surface, the concrete of additive manufacturing is shaped and obtains increased density through centrifugal action;

a programmable reinforcement equipment, during the centrifugal printing process, integrated reinforcement is achieved through wall mounted laying, positioning and inserting reinforcing bars.

2. The centrifugal programmable construction device for excavating concrete structure according to claim 1, wherein, the push-type excavation equipment uses a blade to cut and crush rocks for tunneling construction, and transmits and collects crushed stones, sand, soil, and water through a screw conveyor by using a motor into the centrifugal screening equipment.

3. The centrifugal programmable construction device for excavating concrete structure according to claim 1, wherein, the programmable reinforcement equipment comprises arranging reinforcements between the layers of printed concrete strips by using the wall mounted laying, and positioning and inserting reinforcements inside the printed concrete strips to form an integrated reinforced concrete structure.

4. The centrifugal programmable construction device for excavating concrete structure according to claim 3, wherein, the programmable reinforcement equipment utilizes a robotic arm to position and lay the reinforcement materials in terms of the cylindrical coordinates of the centrifugal rotating outer cylinder.

5. A method of construction in underground, underwater, and extreme construction environment comprising the step of utilizing the centrifugal programmable construction device for excavating concrete structure according to claim 1, wherein the extreme construction environment is lunar environment, Martian environment, polar environment, or nuclear explosion environment.

6. The method of construction for utilizing the centrifugal programmable construction device for excavating concrete structure in underground, underwater, and extreme construction environment according to claim 5, wherein, the method comprises the following steps:

step 1: based on information from geotechnical and geological surveys, using a positioning system to guide engineering excavation, and the push-type excavation equipment collecting the crushed stones, sand, soil, and water, processing the crushed stones, sand, soil, and water into concrete aggregate raw materials, and transmitting concrete aggregate raw materials into the centrifugal screening equipment;

step 2: the centrifugal screening equipment crushing and screening the raw materials, distinguishing crushed stones, sand, soil, and water, and transmitting crushed stones, sand, soil, and water to the programmable batching equipment respectively for material production;

step 3: the programmable batching equipment mixing the concrete aggregate raw materials, cementitious materials, auxiliary materials, admixtures, activators, and water according to the quality and particle size parameters to form the wet concrete materials;

step 4: the centrifugal printing equipment pumping and extruding the wet concrete materials, and processing the wet concrete materials layer by layer on the outer cylinder wall with high-speed, then obtaining the dense and high-strength concrete structures by using additive manufacturing and centrifugal molding processes;

step 5: the programmable reinforcement equipment locating the reinforcement materials according to the coordinates of the outer cylinder wall, laying the reinforcement materials between the printed stacked concrete layers, and inserting the reinforcement materials inside the printed concrete to form a spatial overall reinforced concrete structure;

step 6: pushing the formed concrete structure outward and continuing the printing and reinforcement production of the structure in the next section;

step 7: repeating the above steps until the construction of the structure is completed.

\* \* \* \* \*